(12) United States Patent
Yasukawa et al.

(10) Patent No.: US 11,729,745 B2
(45) Date of Patent: Aug. 15, 2023

(54) USER APPARATUS AND RESOURCE SELECTION METHOD

(71) Applicant: NTT DOCOMO, INC., Tokyo (JP)

(72) Inventors: Shimpei Yasukawa, Tokyo (JP); Hiroki Harada, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/157,414

(22) Filed: Jan. 25, 2021

(65) Prior Publication Data

US 2021/0144685 A1 May 13, 2021

Related U.S. Application Data

(63) Continuation of application No. 15/513,505, filed as application No. PCT/JP2015/076735 on Sep. 18, 2015, now Pat. No. 10,932,230.

(30) Foreign Application Priority Data

Sep. 25, 2014 (JP) .................................. 2014-195883

(51) Int. Cl.
*H04W 72/04* (2023.01)
*H04W 92/18* (2009.01)
*H04W 8/00* (2009.01)

(52) U.S. Cl.
CPC ........... *H04W 72/04* (2013.01); *H04W 92/18* (2013.01); *H04W 8/005* (2013.01)

(58) Field of Classification Search
CPC ...... H04W 72/04; H04W 92/18; H04W 8/005
See application file for complete search history.

(56) References Cited

U.S. PATENT DOCUMENTS

| | | | |
|---|---|---|---|
| 2015/0271818 A1* | 9/2015 | Tavildar | H04L 5/0005 375/138 |
| 2016/0028572 A1* | 1/2016 | Suzuki | H04W 72/0413 370/281 |
| 2016/0044694 A1* | 2/2016 | Park | H04W 72/10 370/329 |
| 2016/0219640 A1* | 7/2016 | Jung | H04W 76/14 |
| 2016/0302215 A1* | 10/2016 | Sorrentino | H04W 4/70 |

(Continued)

OTHER PUBLICATIONS

International Search Report issued in PCT/JP2015/076735 dated Dec. 8, 2015 (3 pages).

(Continued)

*Primary Examiner* — Melvin C Marcelo
*Assistant Examiner* — Natali Pascual Peguero
(74) *Attorney, Agent, or Firm* — Osha Bergman Watanabe & Burton LLP

(57) ABSTRACT

A user apparatus for use in a mobile communication system that supports D2D communication, including: a signal transmission unit configured to transmit a plurality of D2D signals; and a resource selection unit configured to select, from a predetermined resource pool, a radio resource having a time resource and a frequency resource for transmitting the plurality of D2D signals, wherein the resource selection unit is configured to select the radio resource such that the plurality of D2D signals are not transmitted by a same time resource.

3 Claims, 22 Drawing Sheets

(56) References Cited

U.S. PATENT DOCUMENTS

2017/0006598 A1\* 1/2017 Uemura .................. H04M 3/00
2017/0048829 A1 2/2017 Kim et al.

OTHER PUBLICATIONS

Written Opinion of the International Searching Authority issued in PCT/JP2015/076735 dated Dec. 8, 2015 (3 pages).
3GPP TR 36.843 V12.0.1; "3rd Generation Partnership Project; Technical Specification Group Radio Access Network; Study on LTE Device to Device Proximity Services; Radio Aspects (Release 12)"; Mar. 2014 (50 pages).
Extended European Search Report issued in corresponding European Patent Application No. 15844032.1, dated Sep. 20, 2017 (12 pages).
Ericsson, "On scheduling procedure for D2D", 3GPP TSG-RAN WG1 Meeting #76, R1-140778, Prague, Czech Republic, Feb. 10-14, 2014 (5 pages).
ASUSTeK, "Discussion on D2D mode 2 SA resource allocation", 3GPP TSG RAN WG1 Meeting #78, R1-143345, Dresden, Germany, Aug. 18-22, 2014 (4 pages).
Office Action issued in the counterpart Chinese Patent Application No. 201580051123.0, dated Oct. 26, 2018 (13 pages).
Office Action issued in Chinese Application No. 201910163420.4 dated Nov. 4, 2022 (13 pages).
Fujitsu, "Distributed resource allocation for D2D broadcast" 3GPP TSG RAN WG1 Meeting #78, R1-142932, Dresden, Germany, Aug. 18-22, 2014 (6 pages).

\* cited by examiner

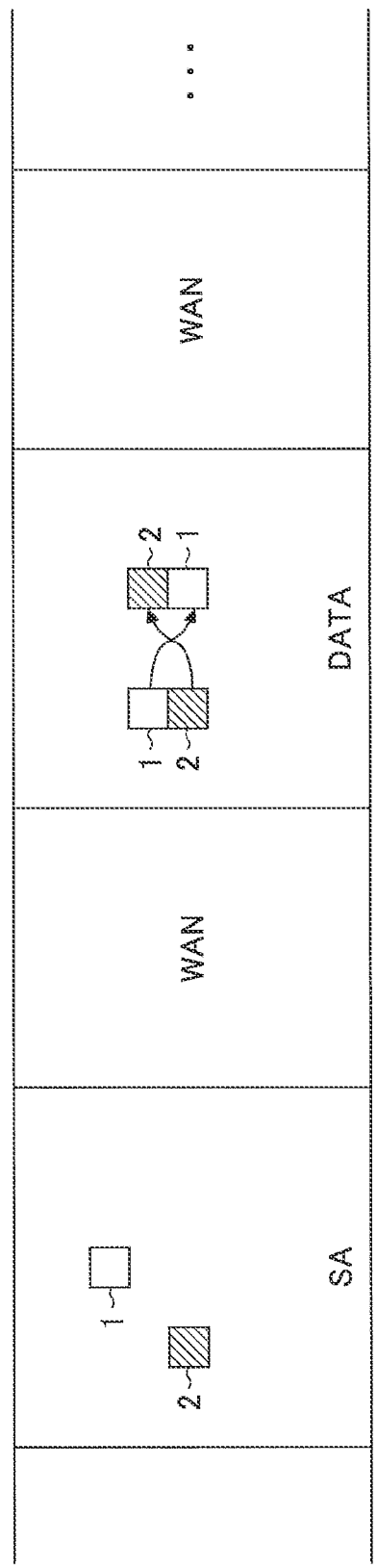

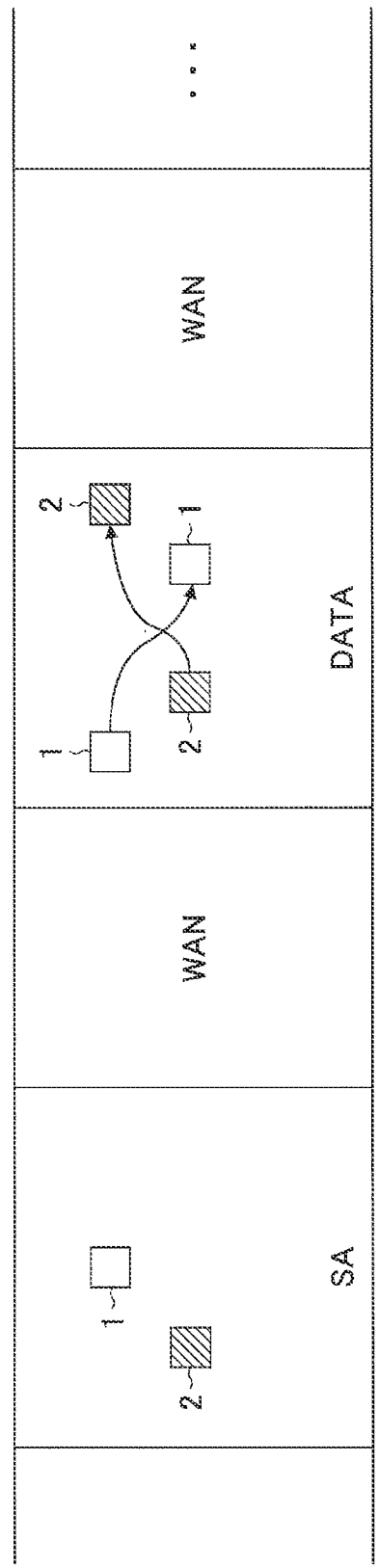

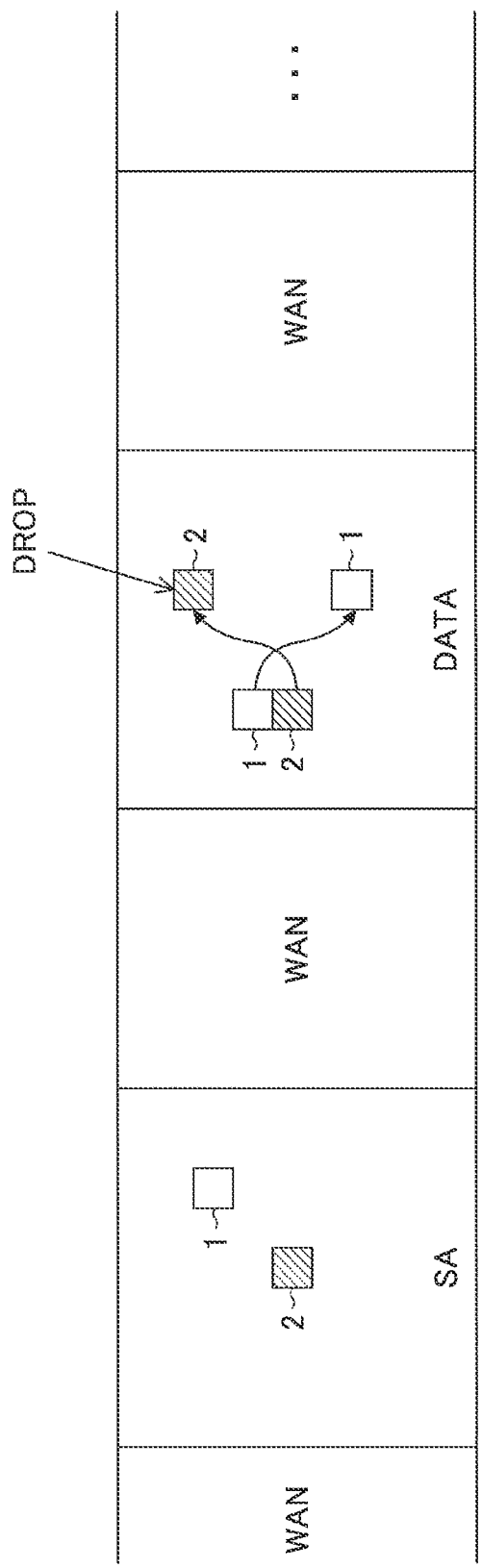

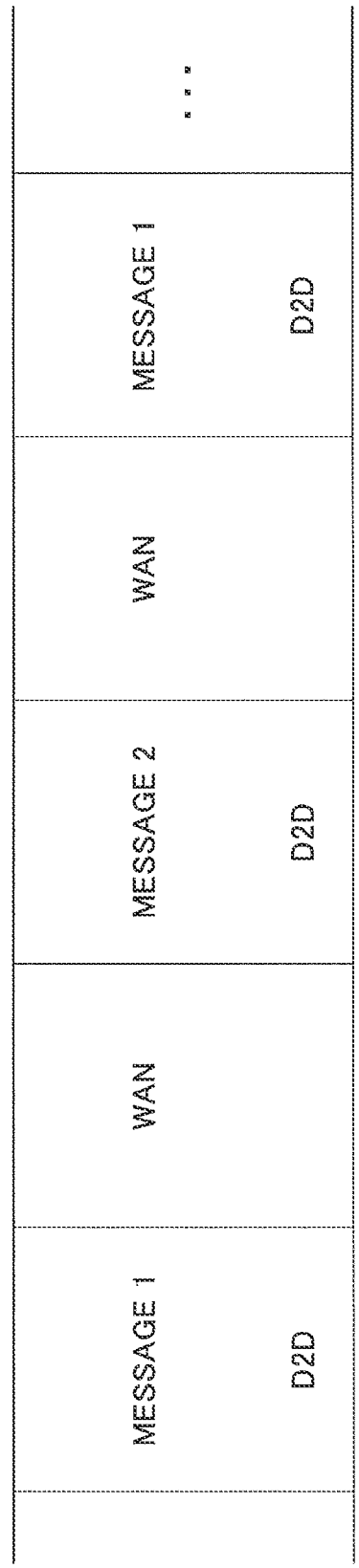

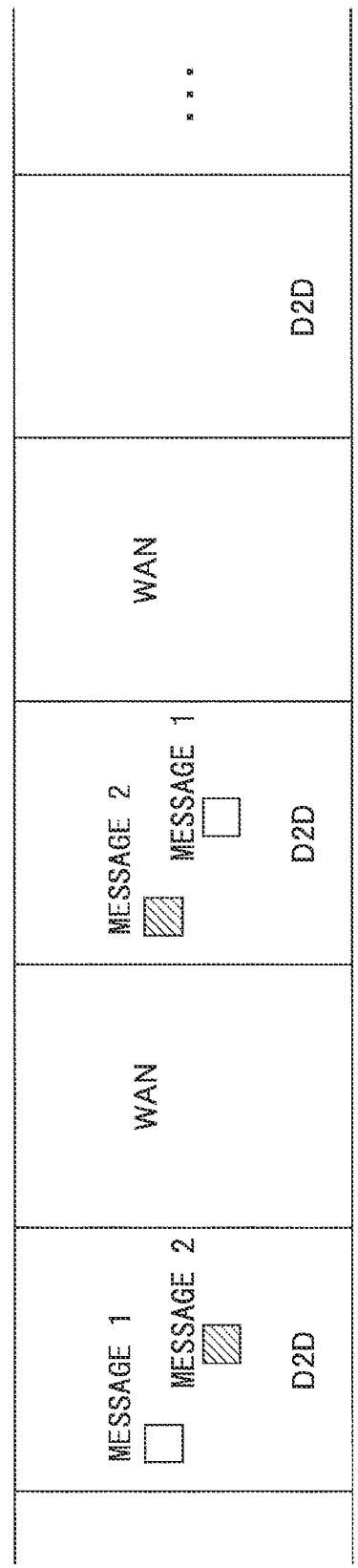

USER APPARATUS AND RESOURCE SELECTION METHOD

CROSS-REFERENCE TO RELATED APPLICATIONS

The present application is a continuation application and, thereby, claims benefit under 35 U.S.C. § 120 to U.S. patent application Ser. No. 15/513,505 filed on Mar. 22, 2017, titled, "USER APPARATUS AND RESOURCE SELECTION METHOD," which is a national stage application of PCT Application No. PCT/JP2015/076735, filed on Sep. 18, 2015, which claims priority to Japanese Patent Application No. 2014-195883 filed on Sep. 25, 2014. The contents of the priority applications are incorporated by reference in their entirety.

TECHNICAL FIELD

The present invention relates to D2D communication (user apparatus-to-user apparatus communication). Especially, the present invention relates to a technique to select a radio resource (resource hereinafter) necessary for a user apparatus UE to transmit a D2D signal.

BACKGROUND ART

In current mobile communications such as LTE, it is common that a user apparatus UE and a base station eNB perform communication so that communication is performed between user apparatuses UE via the base station eNB and the like. However, in recent years, various techniques are proposed on D2D communication (to be referred to as D2D hereinafter) for performing direct communication between user apparatuses UE.

Especially, in D2D communication of LTE, there are proposed "Communication" for performing data communication such as push telephone call between user apparatuses UE, and "Discovery" in which a user apparatus UE transmits a discovery signal including ID of the user apparatus UE itself and/or an application ID and the like so as to cause a user apparatus UE of a receiving side to detect the user apparatus UE of the transmitting side (refer to non-patent document 1). Note that, it is assumed that "Communication" is applied to Public safety (police, fire radio), for example.

In the D2D communication specified in LTE, it is proposed that each user apparatus UE uses a part of uplink resources already specified as transmission resources of an uplink signal from the user apparatus UE to the base station eNB. Also, in assignment of resources used in D2D communication, it is proposed to assist it from the base station eNB. In the following, an explanation is provided about outline of resource assignment for transmission of D2D of LTE that is currently proposed (refer to non-patent document 1).

As to "Discovery", as shown in FIG. 1A, a resource pool is kept for a Discovery signal for each Discovery period, so that the user apparatus UE transmits a Discovery signal in the resource pool. More specifically, there are Type1, Type2a and Type2b. In the Type1, the user apparatus UE autonomously selects a transmission resource from a resource pool. In the Type 2a, a specific resource in a resource pool is dynamically assigned by a (E)PDCCH. In the Type2b, a semi-static resource is assigned by an upper layer signaling (RRC signal, for example).

Also, as to "Communication", as shown in FIG. 1B, it is being considered to periodically keep a resource for SA/Data transmission. SA is an abbreviation of Scheduling Assignment. A user apparatus in a transmission side notifies a reception side of a resource for Data transmission by a resource selected from an SA resource pool, and transmits Data by the resource for Data transmission. This signal for resource notification may be referred to as SA. As to "Communication", more specifically, there are Mode1 and Mode2. In the Mode1, a resource is dynamically assigned by a (E)PDCCH transmitted from the base station eNB to the user apparatus UE. Also, in the assignment of the (E)PDCCH, semi-static resource assignment (SPS: Semi-persistent scheduling) is also proposed. In the Mode 2, the user apparatus UE autonomously selects a transmission resource from the SA resource pool.

FIG. 1C shows an example where D2D resource pools are multiplexed with WAN resources by FDM/TDM more concretely. D2DSS(D2D Synchronization Signal) shown in FIG. 1C is a synchronization signal.

In D2D, it is being considered to transmit a plurality of sessions of Communication and a plurality of Discovery messages.

As shown in FIG. 2A, SA includes an L1 ID (destination ID, transmission source ID and the like), so that it is assumed that the reception side user apparatus UE performs reception filtering of Data based on this ID. In the example shown in the figure, ID of the reception side user apparatus UE is B, so that the user apparatus UE receives SA of destination ID=B and data transmitted by a resource assigned by the SA. Also, ID=B may be interpreted as a transmission source ID.

Since reception filtering is performed based on an ID, the user apparatus UE in the transmission side can transmit a plurality of pieces of SA/Data in D2D communication for different groups/UEs. Hereinafter, communication by SA/Data is to be referred to as a session.

As to "Discovery", in order to support discovery of a UE associated with an application, a case is assumed in which a plurality of Discovery messages different for each application are transmitted. In the example shown in FIG. 2B, it is shown that the user apparatus UE transmits a Discovery message for an application A and a Discovery message for an application B.

RELATED ART DOCUMENT

Non Patent Document

[NON PATENT DOCUMENT 1] 3GPP TR 36.843 V12.0.1 (2014-03)

SUMMARY OF THE INVENTION

Problem to be Solved by the Invention

In a case where a plurality of sessions of SA/Data or a plurality of Discovery messages are simultaneously transmitted using a same resource pool, there is a problem shown below. Note that, in the following, there is a case where signals such as SA/Data and a Discovery message and the like are collectively referred to as "D2D signal". Also, "simultaneously" here means to transmit a plurality of D2D signals within a resource pool, for example, and is not limited to simultaneous in strict meaning such as transmitting a plurality of D2D signals by a same subframe (same time resource).

As a transmission scheme of a D2D signal, it is assumed to use the PUSCH based single carrier transmission scheme (example: SC-FDMA) for both of Communication and Discovery. In the single carrier transmission scheme, there is a problem in that PAPR increases when frequency resources used in the same time resource are discontinuously assigned in the frequency direction. Thus, basically, frequency resources used in the same time resource needs to be assigned continuously.

However, in D2D, it is assumed that time-frequency hopping is performed according to a predetermined hopping pattern in SA or Discovery or the like. Thus, for example, even though the user apparatus UE selects continuous resources for initial transmission of a plurality of D2D signals, there is a possibility in that discontinuous resource assignment occurs due to the time-frequency hopping. That is, as shown in FIG. 3A, even though continuous resources are selected for transmission of two D2D signals, the resources may become discontinuous resources after hopping.

Also, there is a problem in that transmission power density decreases due to increase of the number of resources (PRB and the like) within the same time resource for transmitting a plurality of D2D signals. That is as shown in FIG. 3B, transmission power density decreases by using two resources compared to the case where one resource is used. This may cause a larger problem when priorities are different between D2D signals.

Further, as shown in FIG. 3C, in a case where D2D signals of different transmission powers are multiplexed within the same time resource, if power difference between D2D signals is large, there is a problem in that SINR deterioration of the D2D signal in the lower power side occurs. This is caused by In-band emission, dynamic range of transmission and reception RF and the like.

The above-mentioned problem that occurs when simultaneous transmission is performed is not limited to resource selection within a resource pool, but similar problem may occur between resource pools when resource pools are frequency-multiplexed.

The present invention is contrived in view of the above-mentioned point, and an object of the present invention is to provide a technique for making it possible that a user apparatus properly performs simultaneous transmission of a plurality of D2D signals.

Means for Solving the Problem

According to an embodiment of the present invention, there is provided a user apparatus for use in a mobile communication system that supports D2D communication, including:
a signal transmission unit configured to transmit a plurality of D2D signals; and
a resource selection unit configured to select, from a predetermined resource pool, a radio resource having a time resource and a frequency resource for transmitting the plurality of D2D signals,
wherein the resource selection unit is configured to select the radio resource such that the plurality of D2D signals are not transmitted by a same time resource.

According to an embodiment of the present invention, there is provided a user apparatus for use in a mobile communication system that supports D2D communication, including:
a signal transmission unit configured to transmit a plurality of D2D signals; and
a resource selection unit configured to select, from a predetermined resource pool, a radio resource having a time resource and a frequency resource for transmitting the plurality of D2D signals,
wherein the resource selection unit is configured to select the radio resource such that the plurality of D2D signals are not transmitted by using a plurality of discontinuous frequency resources in a same time resource.

According to an embodiment of the present invention, there is provided a resource selection method executed by a user apparatus for use in a mobile communication system that supports D2D communication, including:
a resource selection step of selecting, from a predetermined resource pool, a radio resource having a time resource and a frequency resource for transmitting a plurality of D2D signals, and
a signal transmission step of transmitting the plurality of D2D signals by using the radio resource selected by the resource selection step,
wherein, in the resource selection step, the user apparatus selects the radio resource such that the plurality of D2D signals are not transmitted by a same time resource.

According to an embodiment of the present invention, there is provided a resource selection method executed by a user apparatus for use in a mobile communication system that supports D2D communication, including:
a resource selection step of selecting, from a predetermined resource pool, a radio resource having a time resource and a frequency resource for transmitting a plurality of D2D signals, and
a signal transmission step of transmitting the plurality of D2D signals by using the radio resource selected by the resource selection step,
wherein, in the resource selection step, the user apparatus selects the radio resource such that the plurality of D2D signals are not transmitted by using a plurality of discontinuous frequency resources in a same time resource.

Effect of the Present Invention

According to an embodiment of the present invention, the user apparatus can properly perform simultaneous transmission of a plurality of D2D signals.

BRIEF DESCRIPTION OF THE DRAWINGS

FIG. 8A is a diagram for explaining a resource selection method 1-4 in the example 1;

FIG. 8B is a diagram for explaining a resource selection method 1-4 in the example 1;

FIG. 9 is a diagram for explaining a resource selection method 1-5 in the example 1;

FIG. 10A is a diagram for explaining a resource selection method 2-1 in an example 2;

FIG. 10B is a diagram for explaining a resource selection method 2-1 in the example 2;

EMBODIMENTS FOR CARRYING OUT THE INVENTION

In the following, an embodiment of the present invention is described with reference to figures. The embodiment described below is merely an example, and the embodiment to which the present invention is applied is not limited to the embodiment below. For example, it is assumed that the communication system of the present embodiment is a system of a scheme that complies with LTE. However, the present invention is not limited to LTE, and can be also applied to other schemes. In the specification and the claims, the term "LTE" is used to widely mean not only a communication scheme corresponding to 3GPP release 8 or 9, but also a communication scheme corresponding to 3GPP release 10, 11, 12 or later release. Although, as an example of a plurality of D2D signals transmitted simultaneously, two D2D signals are shown in the following description, the number of D2D signals transmitted simultaneously may be equal to or greater than three.

(System Configuration)

Figure 1A:
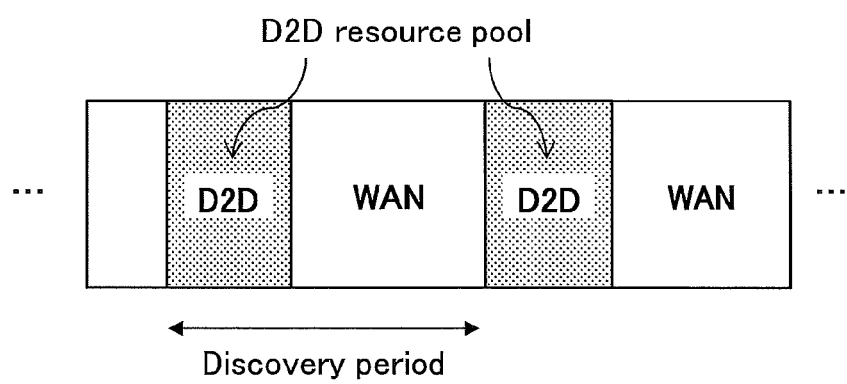
FIG. 1A is a diagram for explaining D2D communication.
Figure 1B:
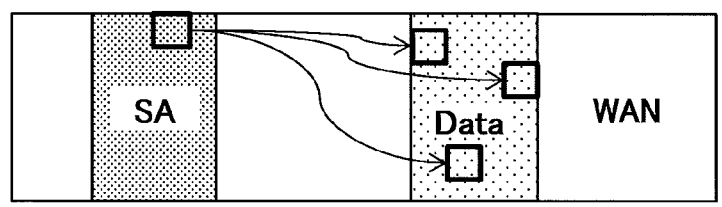
FIG. 1B is a diagram for explaining D2D communication.
Figure 1C:
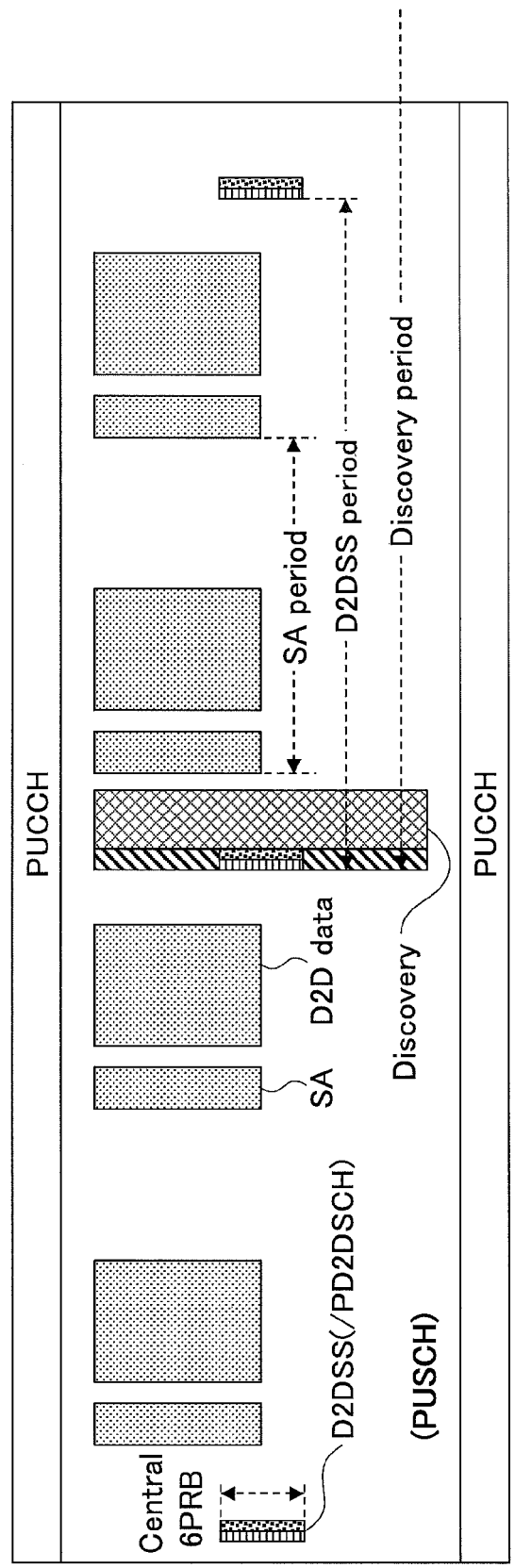
FIG. 1C is a diagram for explaining D2D communication.
Figure 2A:
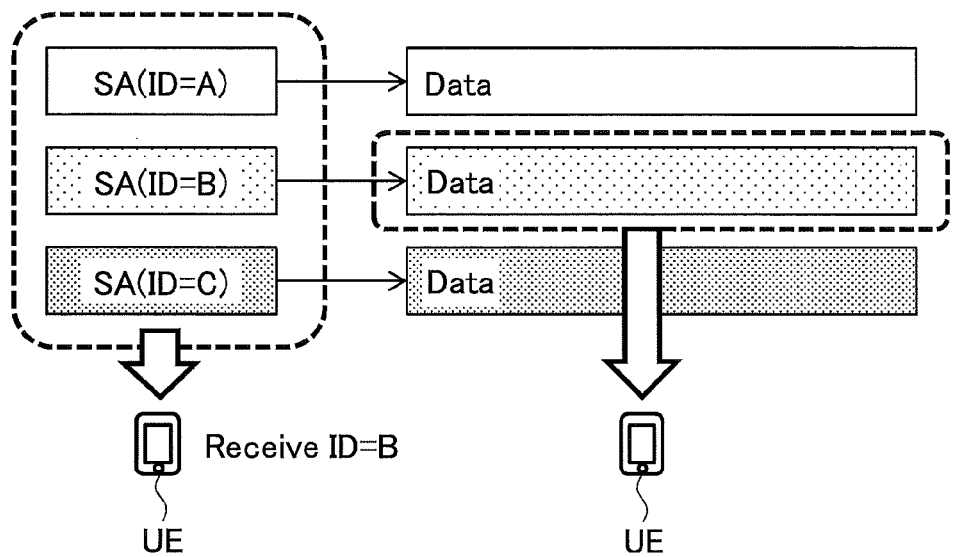
FIG. 2A is a diagram showing transmission of a plurality of sessions/a plurality of messages.
Figure 2B:
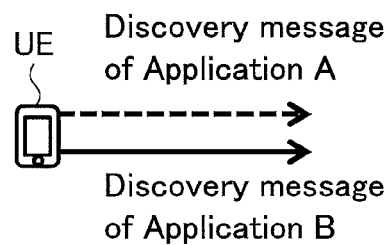
FIG. 2B is a diagram showing transmission of a plurality of sessions/a plurality of messages.
Figure 3A:
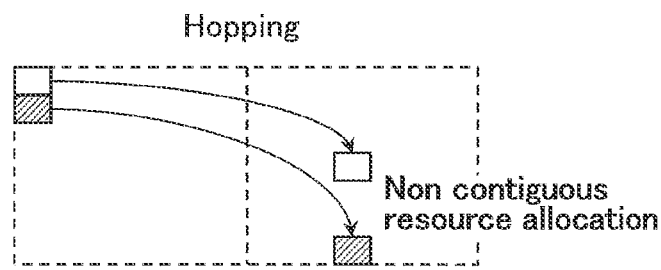
FIG. 3A is a diagram for explaining a problem.
Figure 3B:
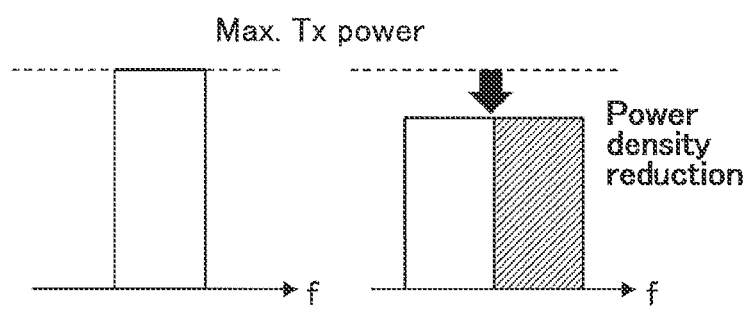
FIG. 3B is a diagram for explaining a problem.
Figure 3C:
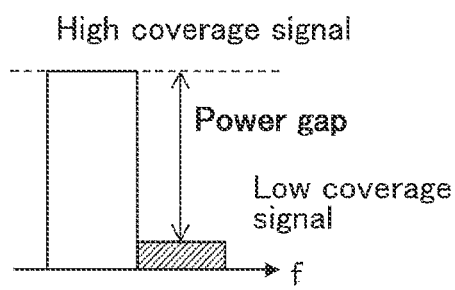
FIG. 3C is a diagram for explaining a problem.
Figure 4:
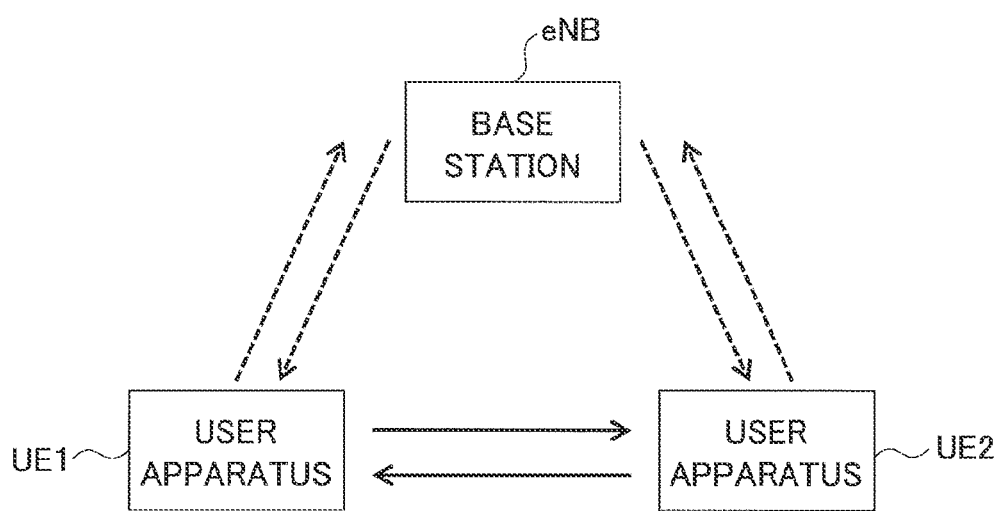
FIG. 4 is a block diagram of a system in an embodiment of the present invention.

FIG. 4 is a diagram showing a configuration example of a mobile communication system in an embodiment (common to each example) of the present invention. As shown in FIG. 4, the communication system of the present embodiment is a cellular communication system in which there are user apparatuses UE1 and UE2 under a base station eNB. Each of the user apparatuses UE1 and UE2 has a D2D communication function, so that D2D communication can be performed between the user apparatuses UE1 and UE2. Also, each of the user apparatuses UE1 and UE2 can perform normal cellular communication with the base station eNB, and can receive resource assignment for D2D communication from the base station eNB.

FIG. 4 shows that user apparatuses UE1 and UE2 exist in coverage of the base station eNB. However, this is an example, and the present invention can be executed even when the user apparatus UE is out of coverage of the base station. Hereinafter, the user apparatuses UE1 and UE2 are collectively referred to as a user apparatus UE.

In the present embodiment, the user apparatus UE transmits a plurality of sessions of SA/Data simultaneously, and transmits a plurality of Discovery messages simultaneously. That is, the user apparatus UE transmits a plurality of D2D signals simultaneously. "Simultaneously" here means to transmit a plurality of D2D signals within a resource pool, for example, and is not limited to simultaneous in strict meaning such as transmitting a plurality of D2D signals by a same subframe (same time resource).

Also, in the present embodiment, a time resource for transmitting one D2D signal is one subframe. However, this is an example. A time resource for transmitting one D2D signal may be a unit (example: slot) smaller than the subframe, and also, a time resource for transmitting one D2D signal may be a time length of a plurality of subframes.

As described before, when transmitting a plurality of D2D signals simultaneously, problems may occur such as (a) discontinuous frequency resource assignment, (b) reduction of transmission power density, (c) transmission power gap and the like. Therefore, in the present embodiment, in order to solve these problems, solving methods are adopted such as (X) time multiplexing of transmission resources, (Y) continuous resource assignment by restriction of resource selection·assignment, (Z) no transmission (Drop) of discontinuous resources, (W) switching of operation of discontinuous resource assignment based on UE capability, and the like.

As to relationship between solving methods and problems, for example, (X) is effective for (a), (b) and (c), (Y) is effective for (a), (Z) is effective for (a) (partially effective for (b) and (c)), and (W) is effective for (a).

In the following, as examples using the solving methods, examples 1-5 are described. In the following description of each example, a symbol such as (X), (Y), (Z) added as necessary indicates a solving method, of the above-mentioned solving methods, corresponding to each method or the like.

Example 1

First, as an example on "Communication" of D2D, an example 1 is described.

Figure 5:
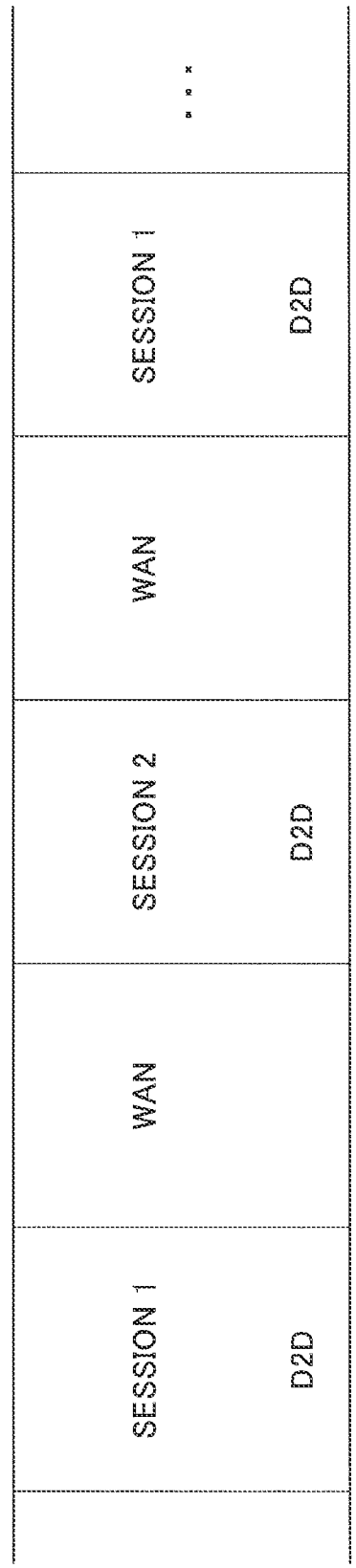
FIG. 5 is a diagram for explaining a resource selection method 1-1 in an example 1.

FIG. 5 is a diagram for explaining a resource selection method 1-1 (X) in the example 1. The resource selection method 1-1 is common for SA and Data, in which, as shown in FIG. 5, the user apparatus UE transmits different sessions of signals (SA/Data) for each transmission occasion of D2D (SA or Data). FIG. 5 shows an example for alternately transmitting a signal of session 1 and a signal of session 2 in each transmission occasion. The "transmission occasion" here may be, for example, a resource pool that arrives periodically and that is assigned from the base station eNB or may be different time positions (subframe group) within a resource pool. For a signal of a session, retransmission of it may be performed within the transmission occasion. The retransmission signal is transmitted within the transmission occasion, and transmission of a plurality of sessions of signals is not performed within one transmission occasion.

Also, the user apparatus UE may transmit an SA of a session in a transmission occasion, and transmit Data of the session in another time position within the transmission occasion, or the use apparatus UE may transmit an SA of a session in a transmission occasion, and transmit Data of the session in another transmission occasion different from the transmission occasion. In the latter case, in the other transmission occasion where Data of the session is transmitted, SA/Data of different session is not transmitted.

Next, a resource selection method 1-2 in the example 1 is described. The resource selection method 1-2 is an example of a resource selection method for transmitting a plurality of SAs in Mode 2 communication (UE autonomously selects resources from an SA resource pool).

In the resource selection method 1-2, the user apparatus UE performs resource selection such that a plurality of SAs, including retransmission, are not transmitted by a same subframe (X). That is, resource selection is performed such that a plurality of SAs are transmitted by a plurality of different subframes. Also, when the user apparatus UE performs resource selection such that a plurality of SAs are transmitted by the same subframe, the user apparatus UE performs resource selection such that discontinuous resource assignment, including retransmission, does not occur in the frequency direction (Y). That is, when transmitting a plurality of SAs by the same subframe, the user apparatus UE assigns the plurality of SAs to continuous resources in the frequency direction and transmit them.

In the present embodiment, an SA is transmitted within a resource pool two times. At the first transmission, the SA is transmitted by a resource selected by the user apparatus UE, and at the second transmission, the SA is transmitted by a resource calculated according to a predetermined hopping pattern.

As the hopping pattern of SA, for example, there is a scheme for calculating a time position and a frequency position of a resource of the second transmission by using a predetermined calculation equation based on a time position and a frequency position of a resource of the first transmission. For example, when the time position and the frequency position of the first transmission are t1 and f1 respectively, and the time position and the frequency position of the second transmission are t2 and f2 respectively, t2 and f2 can be represented as t2=A(t1,f1) and f2=B(t1,f1). It can be also considered to perform retransmission using continuous time indexes for SA without performing time hoping.

Also, there is an example to perform hopping of SA using Type 1 PUSCH hopping or Type 2 PUSCH hopping defined in cellular communication. Also, there is a pattern in which a hopping pattern is defined by a bit map pattern of subframes so that a plurality of SAs transmitted at the first time by a same subframe are transmitted by the same subframe also at retransmission.

Figure 6A:
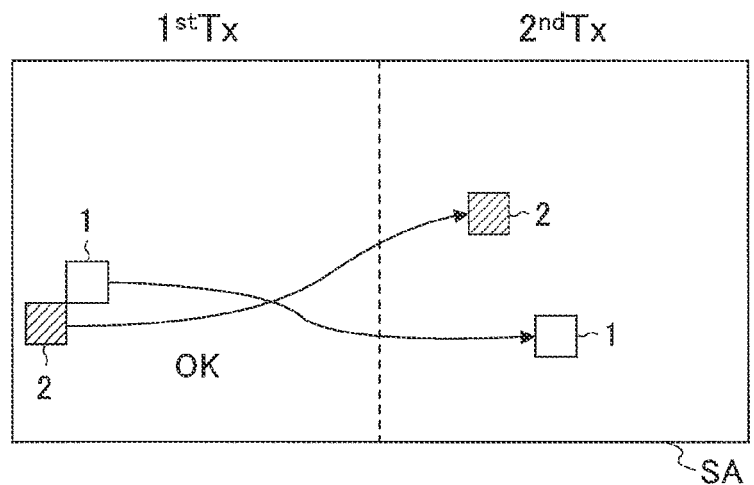
FIG. 6A is a diagram for explaining a resource selection method 1-2 in the example 1.
Figure 6B:
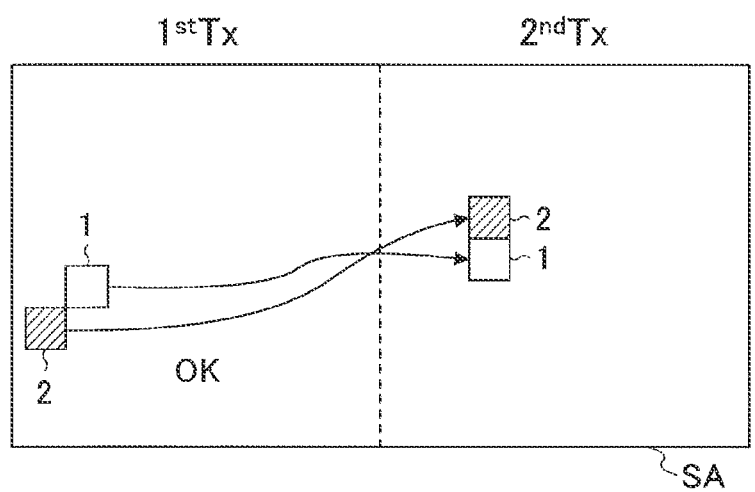
FIG. 6B is a diagram for explaining a resource selection method 1-2 in the example 1.
Figure 6C:
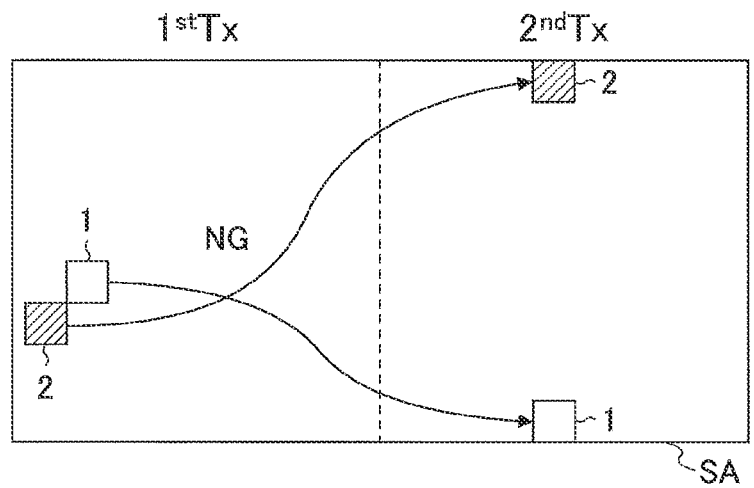
FIG. 6C is a diagram for explaining a resource selection method 1-2 in the example 1.

FIGS. 6A-6C are diagrams for explaining the resource selection method 1-2 in the example 1. In each example of FIGS. 6A-6C, the user apparatus UE transmits SAs of sessions 1 and 2 by different subframes at the first time, and performs retransmission according to a predetermined hopping pattern for each SA.

In the example of FIG. 6A, the user apparatus UE selects a resource of each SA of initial transmisison such that subframes for retransmission by the predetermined hopping pattern become different between SAs. This can be realized by a procedure of, for example, arbitrarily selecting a resource of each SA of initial transmisison, calculating a resource for retransmission by a predetermined hopping pattern, checking whether subframes for retransmission are different between SAs, and adopting it if they are different, and repeating similar procedure by selecting different initial resource if they are different. Same applies to other examples.

Also, in the example of FIG. 6B, the user apparatus UE selects a resource of each SA of initial transmission such that subframes for retransmission by the predetermined hopping pattern become the same between SAs and that frequency direction resources become continuous.

FIG. 6C shows an example when resource selection of the resource selection method 1-2 cannot be performed, in which discontinuous resources of a same subframe are assigned to a plurality of SAs when retransmission. In the case where two SAs are transmitted two times like the examples of FIGS. 6A-6C, it can be considered that there are very few cases in which only resource selection shown in FIG. 6C is performed. However, in a case where more SAs are transmitted, or, in a case where retransmission is performed equal to or more than two times by a predetermined hopping pattern, it can be considered that, a case occurs in which discontinuous resources of a same subframe are assigned in retransmission occasions of two SAs like the case shown in FIG. 6C.

The SA is transmitted two times within a resource pool, and the transmission resource of the SA is reselected each time of the SA period. Thus, UE complexity for validity determination of resource selection (example: determine that the case of FIG. 6C does not occur) does not increase.

The resource selection method 1-2 may be also applied to Mode 1 communication (perform SA resource assignment dynamically from the eNB). In this case, when the base station eNB assigns resources for transmitting a plurality of SAs to the user apparatus UE, the base station eNB performs resource assignment such that a plurality of SAs including retransmission are transmitted by different subframes. Or, the base station eNB performs resource assignment such that a plurality of SAs including retransmission are transmitted in a same subframe by continuous resources in the frequency direction.

Figure 7:
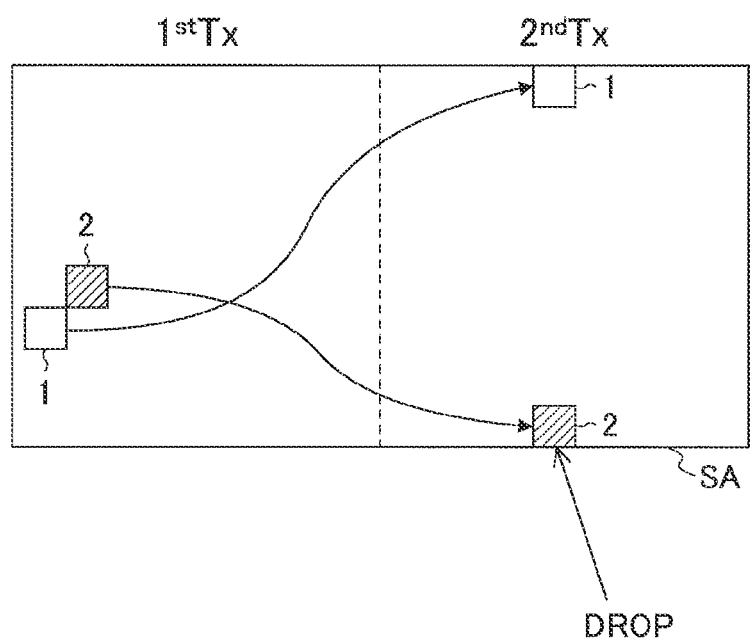
FIG. 7 is a diagram for explaining a resource selection method 1-3 in the example 1.

Next, a resource selection method 1-3 (Z) in the example 1 is described with reference to FIG. 7. In the resource selection method 1-3, when resources assigned to a plurality of SAs become the same subframe and discontinuous in the frequency direction due to hopping retransmission in the resource selection method 1-2, an SA is dropped (not retransmitted). In the example shown in FIG. 7, an SA of session 2 is dropped. Which SA to drop may be predetermined in the user apparatus UE, or may be notified to the user apparatus UE from the base station eNB beforehand.

Also, prioritization may be performed according to a service to apply. For example, higher priority is assigned to Public safety, than that of Non-public safety, for which necessity of delivering signals without fail is high, so that a D2D signal of a low priority service is dropped preferentially.

Next, a resource selection method 1-4 (X, Y) in the example 1 is described. The resource selection method 1-4 in the example 1 is a resource selection method on Data transmission in Mode 1 or Mode 2 communication.

Also in Data transmission, retransmission based on a predetermined hopping pattern is performed. That is, the user apparatus UE selects a Data transmission resource, notifies the reception side of the resource by a SA, performs initial Data transmission by the notified resource, and retransmits Data based on the predetermined hopping pattern. Also, retransmission may be performed equal to or more than two times, and may be performed four times, for example. As a hopping pattern, for example, there is an example, in which, the hopping pattern is defined by a bitmap pattern of subframes, so that a plurality of pieces of Data transmitted by a same subframe are also transmitted by a same subframe in retransmission according to the pattern. Also, there is an example in which, Data of hopping is performed by utilizing Type 1 PUSCH hopping or Type 2 PUSCH hopping. In the resource selection method 1-4, the user apparatus UE that transmits SAs of a plurality of sessions performs resource selection of initial Data transmission in each SA such that a condition from among the following two conditions is satisfied.

Condition 1: A plurality of pieces of Data are in the same subframe and in continuous frequency resources, and continuity of resources in the frequency direction does not collapse by frequency hopping;

Condition 2: A plurality of pieces of Data are transmitted by different subframes.

FIG. 8A is an example in the case where the condition 1 is satisfied. As shown in FIG. 8A, initial transmission of Data1 and Data2 is performed by the same subframe and by continuous frequency resources, and after frequency hopping, continuity of resources in the frequency direction (frequency resources) does not collapse.

FIG. 8B is an example in which the condition 2 is satisfied. As shown in FIG. 8B, Data 1 and Data 2 are transmitted by different subframes in both of initial transmission and retransmission.

Next, a resource selection method 1-5 (Z) in the example 1 is described. In the resource selection method 1-5, in a case where the above-mentioned condition is not satisfied so that discontinuous resources of a same subframe are assigned due to hopping within a resource pool, retransmission of one piece of Data is dropped such that continuous resource is used. In the example of FIG. 9, Data of session 2 is dropped. Which piece of Data to drop may be predetermined in the user apparatus UE or may be notified from the base station eNB to the user apparatus UE beforehand. Note that, "to drop" is that, for example, the user apparatus UE does not assign a radio resource to a signal to drop so as not to transmit the signal.

Also, prioritization may be performed according to a service to apply. For example, higher priority is assigned to Public safety, than that of Non-public safety, for which necessity of delivering signals without fail is high, so that a D2D signal of a low priority service is dropped preferentially.

Also, in Discovery, since only D2DSS (D2D Synchronization Signal) in a subframe of head of a resource pool is used for synchronization, the user apparatus UE that does not transmit D2DSS for Communication may drop D2DSS transmission other than the subframe in the head of the resource pool. Accordingly, discontinuous resource assignment can be avoided, and terminal consumed power can be decreased. In a subframe for D2DSS, in-band emission may be reduced by not transmitting other D2D signals.

Example 2

Next, as an example of "Discovery" of D2D, an example 2 is described. FIGS. 10A and 10B are diagrams for explaining a resource selection method 2-1 (X) in the example 2. As shown in FIGS. 10A and 10B, the user apparatus UE transmits different messages for each transmission occasion. FIG. 10A shows an example in which a message 1 and a message 2 are alternately transmitted for each transmission occasion. The "transmission occasion" here may be, for example, a resource pool that arrives in each Discovery period or may be different time positions (subframe group) within a resource pool. FIG. 10B shows an example in which transmission occasions are determined as different time positions in a resource pool so that different messages are transmitted for each transmission occasion.

For a message, retransmission may be performed within a transmission occasion. But, the retransmission message is transmitted within the transmission occasion, and transmission of a plurality of messages (messages of a plurality of applications) is not performed in one transmission occasion.

Next, a resource selection method 2-2 (X, Y) in the example 2 is described. The resource selection method 2-2 is an example of a resource selection method for transmitting a plurality of messages in Type 1 discovery (UE autonomously selects resource from Discovery resource pool).

In the resource selection method 2-2, the user apparatus UE performs resource selection (X) such that a plurality of messages are not transmitted in a same subframe including retransmission. That is, resource selection is performed such that a plurality of messages are transmitted by different subframes. Also, when the user apparatus UE performs resource selection such that a plurality of messages are transmitted in a same subframe, the user apparatus UE performs resource selection such that discontinuous resource assignment does not occur in the frequency direction including retransmission (Y). That is, when the user apparatus UE transmits a plurality of messages by a same subframe, the user apparatus UE transmits the plurality of messages by assigning continuous resources in the frequency direction.

The message of Discovery may be retransmitted within a resource pool, or may not be retransmitted. If one time retransmission (two times transmission) is performed, a message is transmitted by a resource selected by the user apparatus UE at the first transmission, and a message is transmitted by a resource calculated according to a predetermined hopping pattern in the second time transmission. As the hopping pattern, it can be considered to use a hopping pattern similar to the hopping pattern for SA, for example.

Figure 11A:
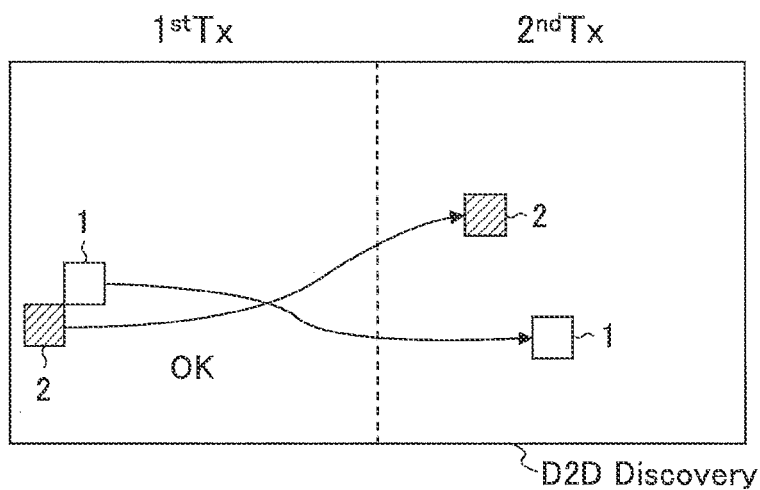
FIG. 11A is a diagram for explaining a resource selection method 2-2 in the example 2.
Figure 11B:
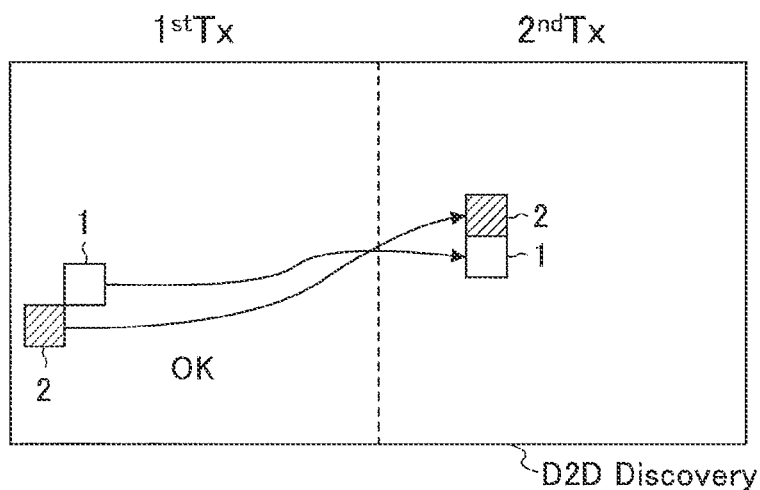
FIG. 11B is a diagram for explaining a resource selection method 2-2 in the example 2.
Figure 11C:
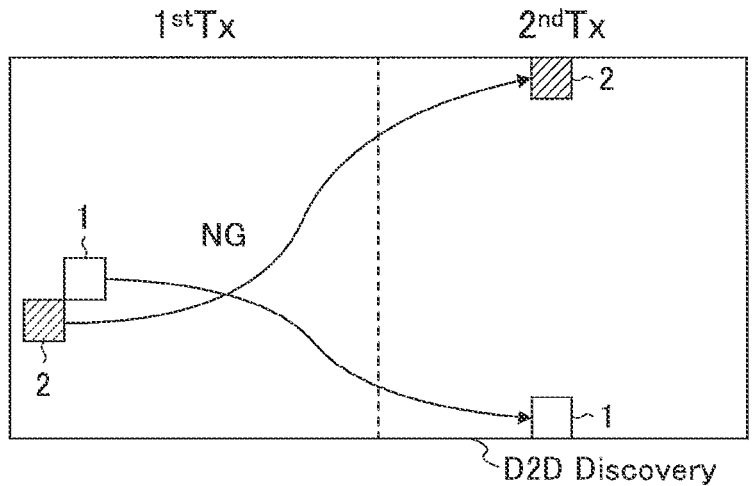
FIG. 11C is a diagram for explaining a resource selection method 2-2 in the example 2.

FIGS. 11A-11C are diagrams for explaining a resource selection method 2-2 in the example 2. In each example of FIGS. 11A-11C, the user apparatus UE transmits messages 1 and 2 by different subframes at initial transmission, and performs retransmission according to a predetermined hopping pattern for each message.

In the example of FIG. 11A, the user apparatus UE selects resources of each message of initial transmission such that subframes for retransmission by the predetermined hopping pattern are different between messages. Also, in the example of FIG. 11B, the user apparatus UE selects resources of each message of initial transmission such that subframes for retransmission by the predetermined hopping pattern are the same between messages, and that resources in the frequency direction are continuous.

FIG. 11C shows an example when the resource selection of the resource selection method 2-2 cannot be performed, in which, in retransmission, discontinuous resources of the same subframe are assigned for a plurality of messages.

The resource selection method 2-2 may be applied to Type 2A and Type 2B (resource assignment is performed from eNB). In this case, when the base station eNB assigns resources for transmitting a plurality of messages to the user apparatus UE, the base station eNB performs resource assignment such that a plurality of messages including retransmission (within resource pool and/or between resource pools) are transmitted by different subframes. Alternatively, the base station eNB performs resource assignment such that a plurality of messages including retransmission are transmitted by resources continuous in the frequency direction in the same subframe.

Figure 12:
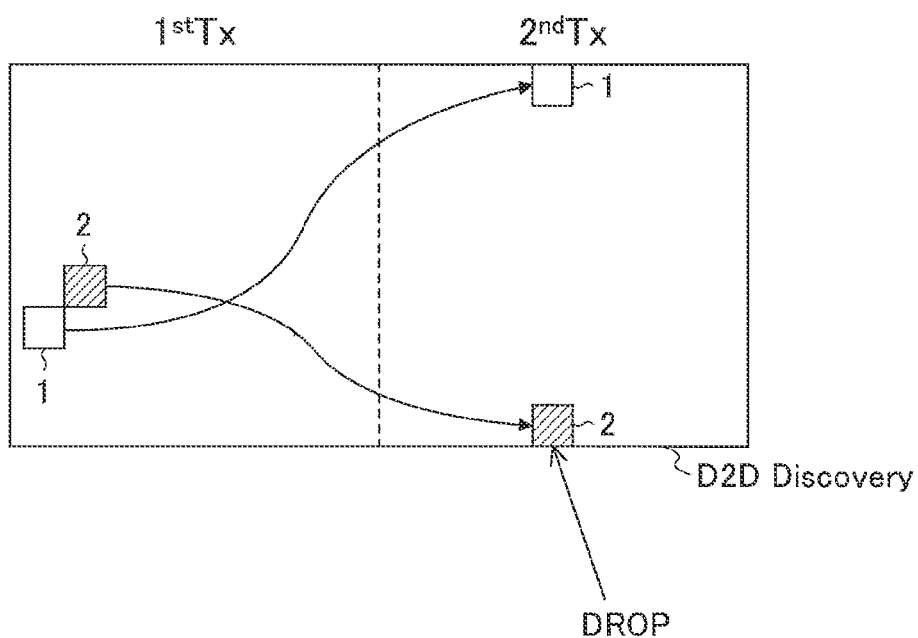
FIG. 12 is a diagram for explaining a resource selection method 2-3 in the example 2.

Next, a resource selection method 2-3 (Z) in the example 2 is described with reference to FIG. 12 and FIG. 13. In the resource selection method 2-3, when resources assigned to a plurality of messages become the same subframe and discontinuous in the frequency direction due to hopping in the resource selection method 2-2, a message is dropped (not retransmitted). In the example shown in FIG. 12, a message 2 is dropped in retransmission within a resource pool.

Figure 13:
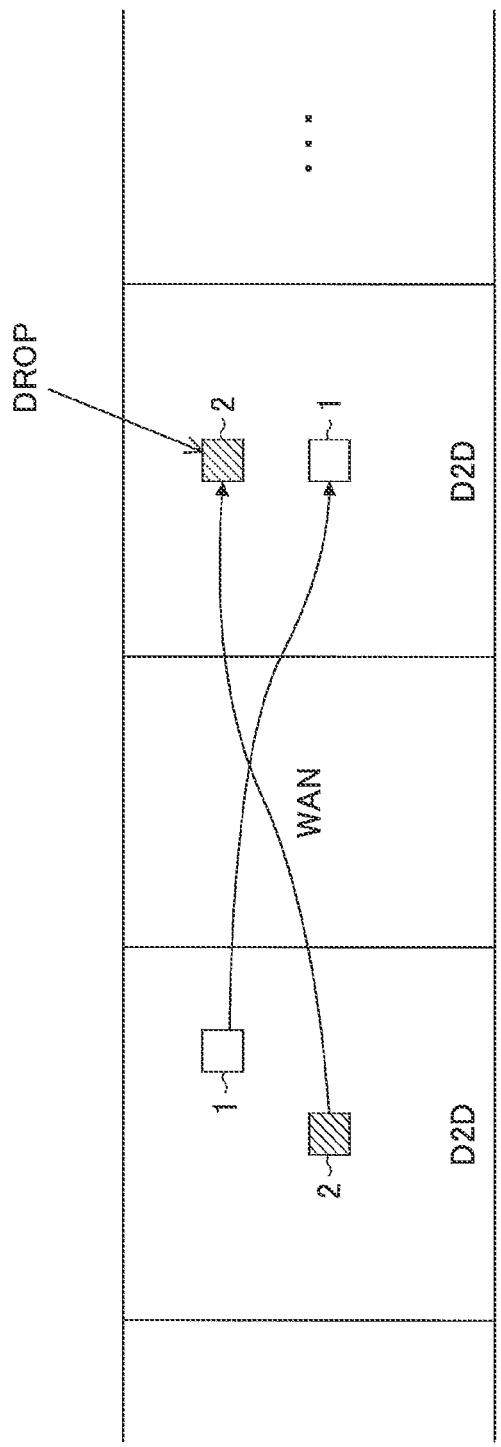
FIG. 13 is a diagram for explaining a resource selection method 2-3 in the example 2.

Also, the example of FIG. 13 assumes Type 2B, in which the message 2 is dropped in retransmission between resource pools. In each case of FIG. 12 and FIG. 13, which message to drop may be predetermined in the user apparatus UE, or may be notified to the user apparatus UE from the base station eNB.

Also, prioritization may be performed according to a service to apply. For example, higher priority is assigned to Public safety, than that of Non-public safety, for which necessity of delivering signals without fail is high, so that a D2D signal of a low priority service is dropped preferentially. A message of high discovery range may be assigned higher priority.

Example 3

Next, an example 3 is described. In the present embodiment, a resource pool for D2D signal (SA or Data or Discovery) transmission is assigned from the base station eNB to the user apparatus UE by a predetermined signaling (SIB, RRC and the like).

In the example 3, the base station eNB does not perform frequency multiplexing (FDM) of resource pools (X). For example, in a case where a resource pool A is assigned for SA and a resource pool B is assigned for Discovery, different time resources are assigned for the resource pool A and the resource pool B. As to frequency resources, they may be the same or may be different between the resource pool A and the resource pool B.

Also, frequency multiplexing of resource pools may be permitted. In this case, the user apparatus UE performs resource selection such that a plurality of D2D signals including retransmission are not transmitted in the same subframe between resource pools like the resource selection method for a plurality of D2D signals in a resource pool described in the example 1-2 (X). That is, resource selection is performed such that a plurality of D2D signals are transmitted by different subframes.

Figure 14:
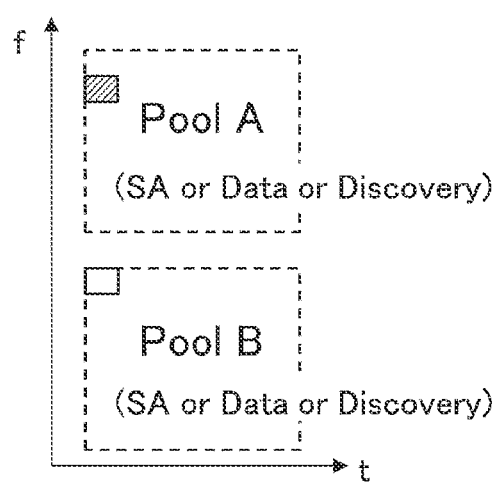
FIG. 14 is a diagram for explaining an example 3.

Also, as shown in FIG. 14, when the user apparatus UE selects transmission resources of D2D signals for different resource pools in the same subframe (can't help but do it), the user apparatus UE drops any of the D2D signals. Which D2D signal to drop may be preconfigured in the user apparatus UE or may be notified from the base station eNB. Also, dropping may be performed based on a predetermined priority order. For example, when SA/Data and Discovery are assigned to the same subframe of different resource pools, it can be considered to drop Discovery. In that case, it can be considered to assign priorities in an order of "SA>Data>Discovery".

Example 4

Next, an example 4 is described. The example 4 is an example of performing transmission power control of a plurality of D2D signals in the user apparatus UE. Here, in a case where a plurality of D2D signals are assigned to a same subframe, it does not matter whether the resources in the frequency direction are continuous or discontinuous. When it is allowed to be discontinuous, it is assumed that the user apparatus UE has a capability for properly performing signal transmission even in the discontinuous resources. Also, in the following example, retransmission is mainly assumed for the case where a plurality of D2D signals are transmitted in a same subframe, but it is not limited to retransmission.

Figure 15:
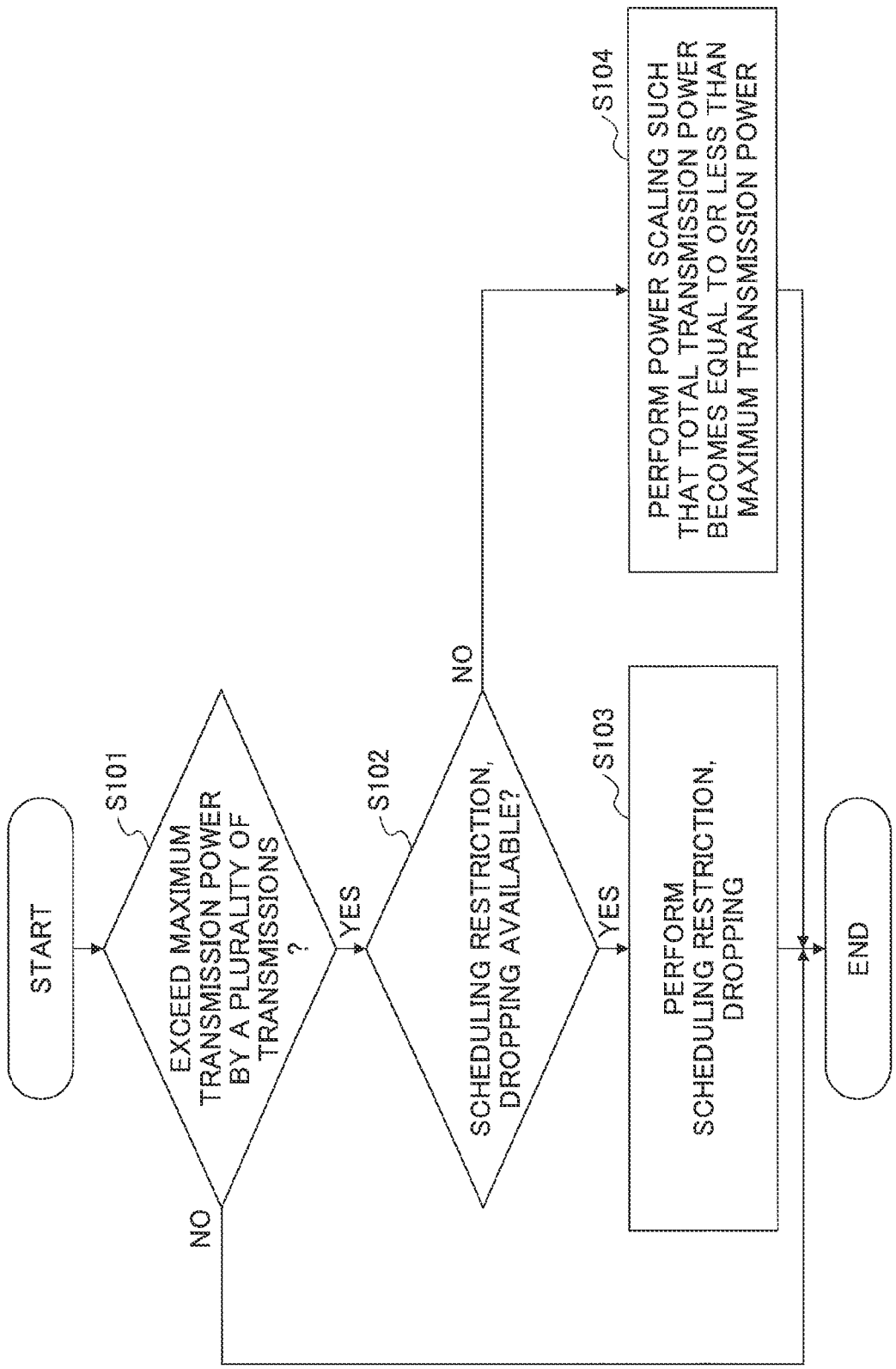
FIG. 15 is a diagram for explaining an example 4.

A control example is described with reference to FIG. 15 in a case where total transmission power exceeds the maximum transmission power by a plurality of D2D signals.

In step 101, the user apparatus UE determines whether the total transmission power for transmitting a plurality of D2D signals exceeds the maximum transmission power of the user apparatus UE. When the determination in step 101 is Yes (exceeding), the user apparatus UE determines whether scheduling control or signal dropping described so far can be performed so as not to transmit a plurality of D2D signals by a same subframe (step 102).

When the determination result of step 102 is Yes, the user apparatus UE performs scheduling control or signal dropping (step 103). When the determination result of step 102 is No (when a plurality of transmissions in the same subframe is performed), the user apparatus UE performs power scaling (to reduce power) such that the total transmission power becomes equal to or less than the maximum transmission power (step 104).

In step 104, for example, irrespective of types of signals, transmission power of a D2D signal of higher transmission power among the plurality of D2D signals is scaled. Also, scaling may be performed by prioritizing SA, Data, and Discovery. As an order of degree of the priority (order of degree by which scaling is not performed), for example, "SA>Data>Discovery" can be considered. Also, priority may be assigned according to a service to be applied. For example, higher priority is assigned to Public safety, than that of Non-public safety, for which necessity of delivering signals without fail is high, so that a D2D signal of a low priority service is scaled preferentially.

Figure 16:
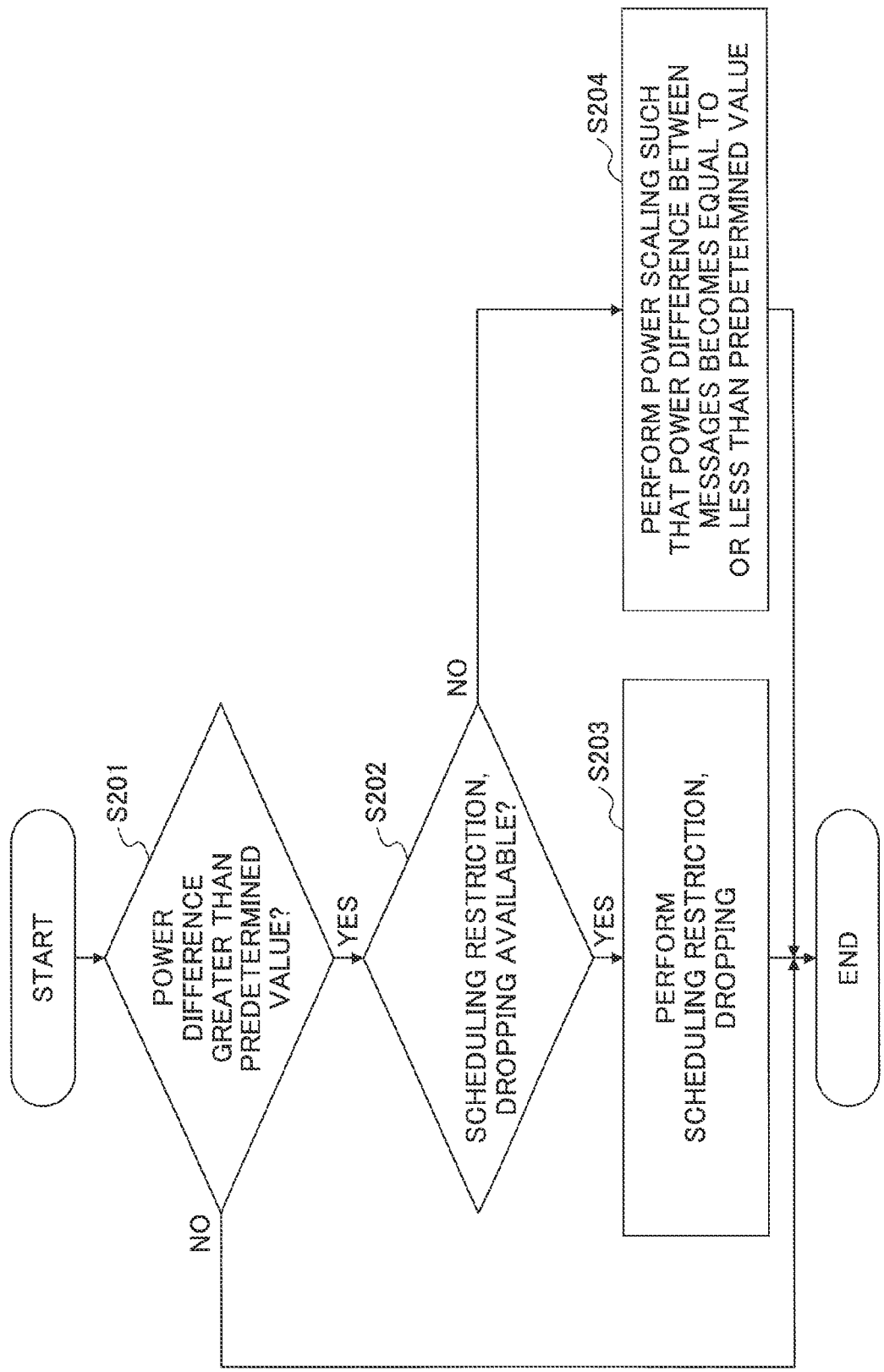
FIG. 16 is a diagram for explaining an example 4.

A control example is described with reference to FIG. 16 in which transmission power is different between a plurality of D2D signals. In step 201, when transmitting a plurality of D2D signals, the user apparatus UE determines whether a transmission power difference between two signals becomes larger than a predetermined value. When the determination of step 201 is Yes (larger than a predetermined value), the user apparatus UE determines whether scheduling control or signal dropping described so far can be performed in order not to transmit a plurality of D2D signals by the same subframe (step 202).

When the determination result of step 202 is Yes, the user apparatus UE performs scheduling control or signal dropping (step 203). When the determination result of step 202 is No (in a case where a plurality of transmissions in the same subframe occur), the user apparatus UE performs power scaling (decreasing power) such that transmission power difference between arbitrary two signals becomes equal to or less than a predetermined value (step 204).

In step 204, for example, irrespective of types of signals, transmission power of a D2D signal of higher transmission power among the plurality of D2D signals is scaled. Also, scaling may be performed by prioritizing SA, Data, and Discovery. As an order of degree of the priority (order of degree by which scaling is not performed), for example, "SA>Data>Discovery" can be considered. Also, priority may be assigned according to a service to be applied. For example, higher priority is assigned to Public safety, than that of Non-public safety, for which necessity of delivering signals without fail is high, so that a D2D signal of a low priority service is scaled preferentially.

Example 5

Next, an example 5 is described. In the example 5, the user apparatus UE transmits, to the base station eNB, as UE capability, presence or absence of capability of transmission of a plurality of D2D signals by discontinuous resources in a same subframe.

Figure 17:
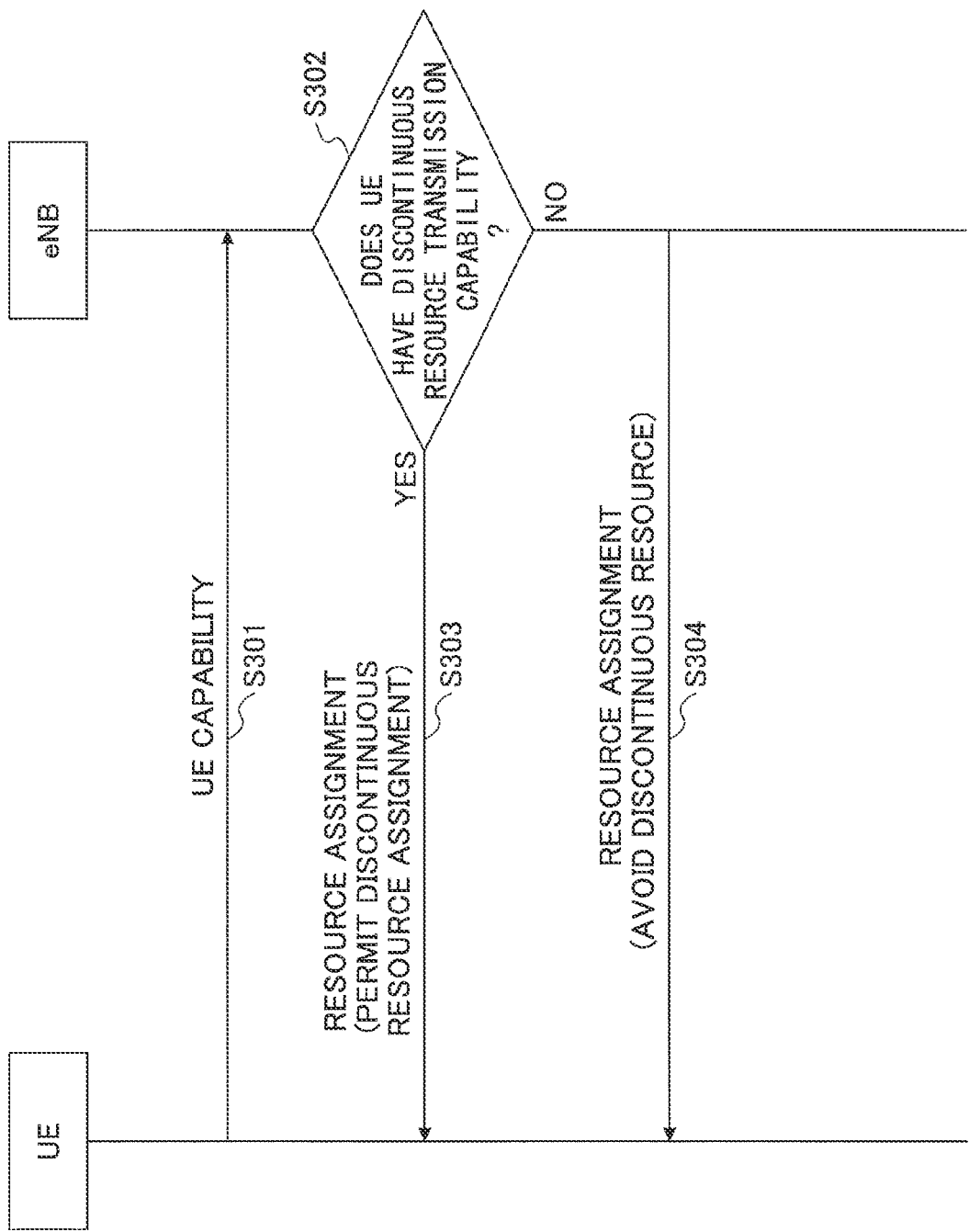
FIG. 17 is a diagram for explaining an example 5.

A procedure example of the example 5 is described with reference to FIG. 17. For example, in response to a request (inquiry) from the base station eNB, the user apparatus UE transmits, to the base station eNB, by upper layer signaling (RRC signaling, for example), the UE capability indicating presence or absence of the capability of transmission of a plurality of D2D signals by discontinuous resources in the same subframe (step 301). Note that, when there is the capability of transmission of a plurality of D2D signals by discontinuous resources in the same subframe, information indicating that the capability exists may be transmitted as UE capability, and if the user apparatus UE does not have the capability, the user apparatus UE may not transmit information on the capability of transmission of a plurality of D2D signals by discontinuous resources in the same subframe.

The base station eNB holds UE capability received in step 301. Then, for example, in a situation where the base station eNB assigns resources for transmitting a plurality of D2D signals to the user apparatus UE, the base station eNB refers to the UE capability. Then, when the user apparatus UE includes the capability for transmitting a plurality of D2D signals by discontinuous frequency resources (Yes in step 302), the base station eNB performs assignment in which assignment of discontinuous resources is permitted (step 303). On the other hand, when the user apparatus UE does not include the capability for transmitting a plurality of D2D signals by discontinuous resources, the base station eNB performs assignment such that resources do not become discontinuous including retransmission (step 304). Note that, the UE capability that the user apparatus UE transmits may include not only presence or absence of D2D transmission capability by discontinuous resources but also presence or absence of capability of simultaneous transmission of D2D signal and a cellular Uplink.

As to the UE capability to transmit, by regarding that the user apparatus UE has capability of discontinuous frequency resource assignment of D2D when the user apparatus UE has a capability of discontinuous resource assignment of PUSCH, capability information of discontinuous resource assignment of PUSCH may be diverted as capability information of discontinuous frequency resource assignment of D2D. However, since the UE capability of discontinuous frequency resource assignment of PUSCH assumes limited transmission resource set (Cluster number) and/or limited resource size, a new UE capability may be defined and used as the capability information of discontinuous frequency resource assignment of D2D.

When discontinuous frequency resource assignment is performed according to the UE capability, MPR (Maximum Power Reduction) according to transmission cluster number may be defined and applied.

In the above, examples 1-5 have been described. Any ones of or all of these examples 1-5 can be combined and executed as necessary.

In a case where transmission of a same time resource occurs for cellular and D2D signals, the D2D signal may be dropped when only one of them can be transmitted due to capability of the UE.

Apparatus Configuration Example

In the following, configuration examples of the user apparatus UE and the base station eNB that execute operation of the embodiment of the present invention (including examples 1-5) are described.

<Configuration Example of User Apparatus UE>

Figure 18:
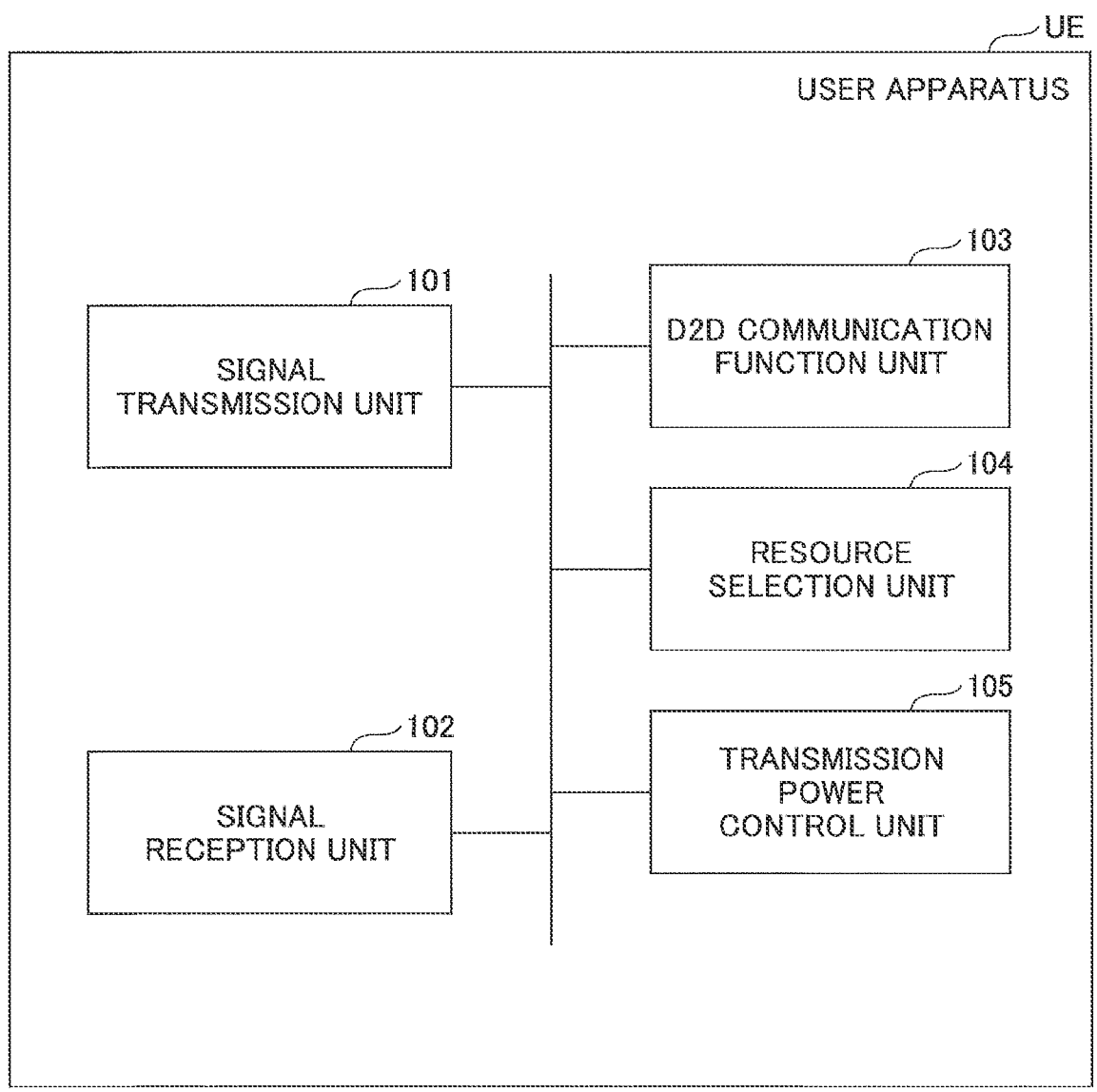
FIG. 18 is a block diagram of a user apparatus UE.

FIG. 18 shows a functional block diagram of the user apparatus UE in the present embodiment. As shown in FIG. 18, the user apparatus UE includes a signal transmission unit 101, a signal reception unit 102, a D2D communication function unit 103, a resource selection unit 104, and a transmission power control unit 105. FIG. 18 only shows functional units especially related to the embodiment of the present invention in the user apparatus UE, and the user apparatus UE also includes at least functions, not shown in the figure, for performing operation complying with LTE. Also, the configuration shown in FIG. 18 is merely an example, and, any functional segmentations and any names of functional units can be used as long as the user apparatus UE can execute processing described in the present embodiment.

The signal transmission unit 101 includes functions configured to generate various signals of physical layer from an upper layer signal to be transmitted from the user apparatus UE, and transmit the signals by radio. Also, the signal transmission unit 101 also includes a function configured to retransmit a D2D signal using a resource according to a predetermined hopping pattern. The signal transmission unit 101 includes a transmission function of D2D communication and a transmission function of cellular communication. Also, the signal transmission unit 101 includes a function configured to transmit UE capability.

The signal reception unit 102 includes functions configured to receive various signals from other user apparatuses UE or a base station eNB by radio and obtain a signal of an upper layer from the received physical layer signals. The signal reception unit 102 includes a reception function of D2D communication and a reception function of cellular communication.

The D2D communication function unit 103 includes a function of a D2D application, and executes Discovery signal transmission and reception control, SA/Data transmission and reception control and the like. The resource selection unit 104 is a functional unit configured to perform the resource selection methods of example 1~example 4 described so far (including control of signal dropping for the signal transmission unit 101). The transmission power control unit 105 is a functional unit configured to perform transmission power control for the example 4.

<Configuration Example of the Base Station eNB>

Figure 19:
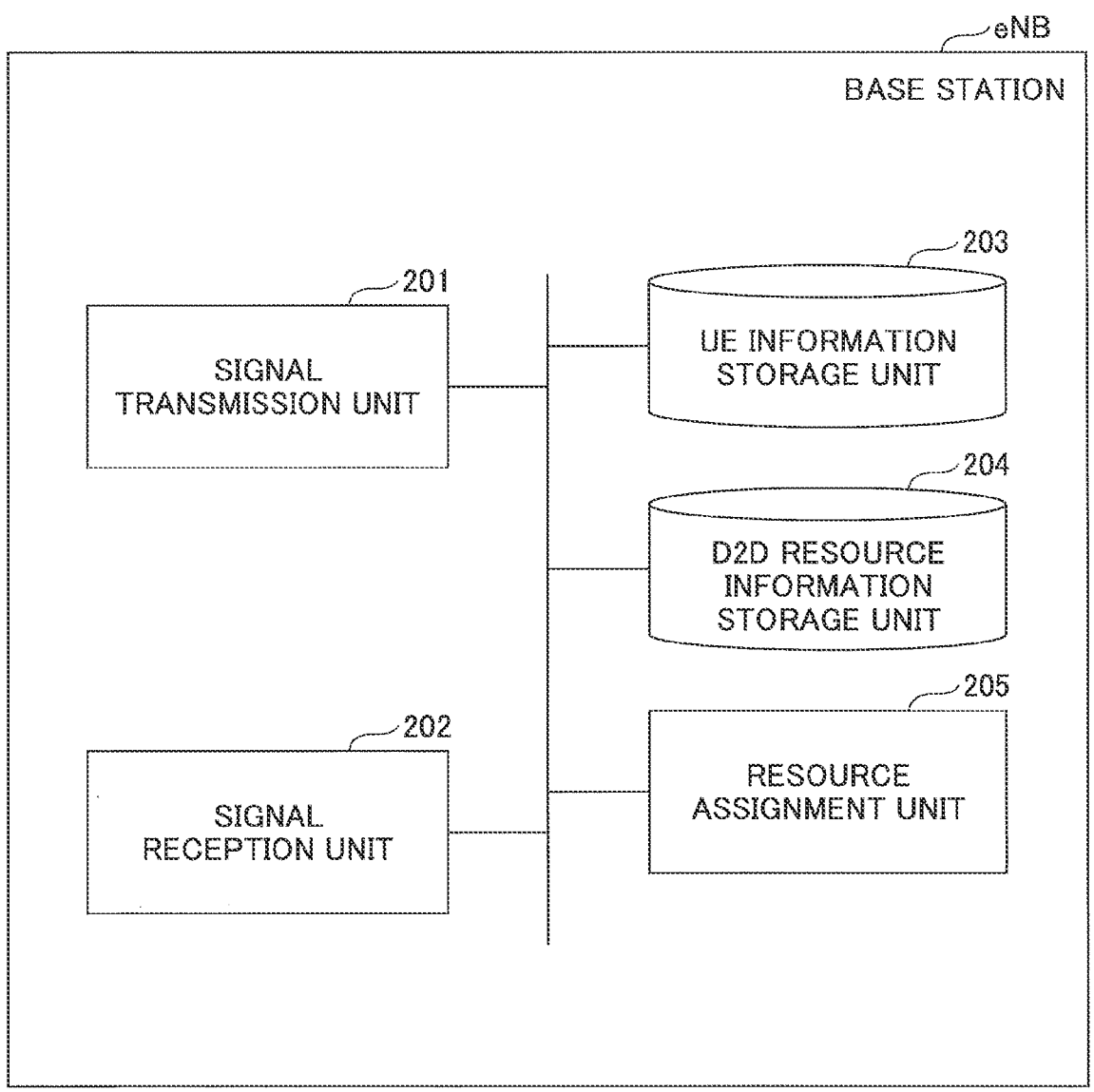
FIG. 19 is a block diagram of a base station eNB.

FIG. 19 shows a functional block diagram of the base station eNB in the present embodiment. As shown in FIG. 19, the base station eNB includes a signal transmission unit 201, a signal reception unit 202, a UE information storage unit 203, a D2D resource information storage unit 204 and a resource assignment unit 205. FIG. 19 only shows functional units especially related to the embodiment of the present invention in the base station eNB, and the base station eNB also includes at least functions, not shown in the figure, for performing operation complying with LTE. Also, the configuration shown in FIG. 19 is merely an example, and, any functional segmentations and any names of functional units can be used as long as the base station eNB can execute processing described in the present embodiment.

The signal transmission unit 201 includes functions configured to generate various signals of physical layer from an upper layer signal to be transmitted from the base station eNB, and transmit the signals by radio. The signal reception unit 202 includes functions configured to receive various signals from a user apparatus UE by radio and obtain a signal of an upper layer from the received physical layer signals.

The UE information storage unit 203 stores information of UE capability received from each UE. The D2D resource information storage unit 204 stores information indicating D2D resources assigned for each UE. When a resource is released, the assignment information is deleted. The resource assignment unit 205 ascertains assignment status of resources for each UE by referring to the UE information storage unit 203 and the D2D resource information storage unit 204 so as to perform D2D resource assignment in consideration of whether to permit discontinuous resources.

Summary of Embodiment

According to the present embodiment, there is provided a user apparatus for use in a mobile communication system that supports D2D communication, including:

a signal transmission unit configured to transmit a plurality of D2D signals; and a resource selection unit configured to select, from a predetermined resource pool, a radio resource having a time resource and a frequency resource for transmitting the plurality of D2D signals, wherein the resource selection unit is configured to select the radio resource such that the plurality of D2D signals are not transmitted by a same time resource. According to this configuration, the user apparatus can properly perform simultaneous transmission of a plurality of D2D signals. For example, simultaneous transmission of a plurality of D2D signals can be performed without increasing PAPR.

When the signal transmission unit performs retransmission of a D2D signal according to a predetermined hopping pattern, the resource selection unit may be configured to select the radio resource such that the plurality of D2D signals are not transmitted by a same time resource in initial transmission and in retransmission. According to this configuration, even when retransmission is performed, it becomes possible that a plurality of D2D signals are not transmitted by a same time resource.

Also, according to the present embodiment, there is provided a user apparatus for use in a mobile communication system that supports D2D communication, including:

a signal transmission unit configured to transmit a plurality of D2D signals; and a resource selection unit configured to select, from a predetermined resource pool, a radio resource having a time resource and a frequency resource for transmitting the plurality of D2D signals, wherein the resource selection unit is configured to select the radio resource such that the plurality of D2D signals are not transmitted by using a plurality of discontinuous frequency resources in a same time resource. According to this configuration, the user apparatus can properly perform simultaneous transmission of a plurality of D2D signals.

The resource selection unit may be configured to select the radio resource such that the plurality of D2D signals are transmitted by using a plurality of continuous frequency resources in a same time resource. According to this configuration, it can be avoided that discontinuous frequency resources in a same time resource are selected.

The resource selection unit may be configured to perform, when a same time resource is selected for the plurality of D2D signals, control to cause the signal transmission unit not to transmit a part of D2D signals such that the plurality of D2D signals are not transmitted using discontinuous frequency resources. According to this configuration, by dropping a part of D2D signals, transmission using discontinuous frequency resources in a same time resource can be avoided.

When the signal transmission unit performs retransmission of a D2D signal in accordance with a predetermined hopping pattern, the resource selection unit may select, in initial transmission and in retransmission, the radio resource such that the plurality of D2D signals are not transmitted using discontinuous frequency resources in a same time resource. According to this configuration, even when retransmission is performed, a plurality of D2D signals are not transmitted using discontinuous frequency resources in a same time resource.

The signal transmission unit may be configured to transmit, to a base station, capability information on capability for transmitting a plurality of D2D signals by using a plurality of discontinuous frequency resources in a same time resource. According to this configuration, the base station can obtain UE capability information on capability for transmitting a plurality of D2D signals by using a plurality of discontinuous frequency resources in a same time resource, so that, assignment can be performed in consideration of the UE capability information when performing resource assignment to the UE.

For example, the predetermined resource pool is frequency-multiplexed resource pools, and the resource selection unit may be configured to select a radio resource for the plurality of D2D signals from different resource pools. According to this configuration, even when a plurality of resource pools are frequency-multiplexed, it can be avoided to transmit signals and the like using discontinuous frequency resources in a same time resource.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiments of the present invention have been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the base station eNB and the user apparatus UE have been explained by using functional block diagrams. However, such apparatuses may be implemented in hardware, software, or a combination thereof.

Each of the software that operates by a processor provided in base station eNB according to an embodiment of the present invention, and the software that operates by a processor provided in the user apparatus UE may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

DESCRIPTION OF REFERENCE SIGNS eNB base station
UE user apparatus
101 signal transmission unit
102 signal reception unit
103 D2D communication function unit
104 resource selection unit
105 transmission power control unit
201 signal transmission unit
202 signal reception unit
203 UE information storage unit
204 D2D resource information storage unit
205 resource assignment unit

The invention claimed is:

1. A terminal comprising:
a processor that performs resource selection such that a plurality of pieces of D2D control information are not transmitted by a same time resource; and
a transmitter that transmits D2D control information by a selected resource,
wherein, when UL transmission and D2D transmission occur in a same time resource and the terminal is not capable of simultaneous transmission of the UL and the D2D, the processor performs only the UL transmission or only the D2D transmission.

2. The terminal as claimed in claim 1,
wherein the processor drops a D2D signal when a power for transmission of a plurality of D2D signals exceeds a maximum transmission power.

3. A communication method executed by a terminal, comprising:
performing resource selection such that a plurality of pieces of D2D control information are not transmitted by a same time resource; and
transmitting D2D control information by a selected resource
wherein, when UL transmission and D2D transmission occur in a same time resource and the terminal is not capable of simultaneous transmission of the UL and the D2D, the terminal performs only the UL transmission or only the D2D transmission.

* * * * *